United States Patent
Wang et al.

(10) Patent No.: US 11,855,449 B2
(45) Date of Patent: Dec. 26, 2023

(54) LIGHTNING PROTECTION APPARATUS AND PHOTOVOLTAIC POWER GENERATION SYSTEM

(71) Applicant: Huawei Digital Power Technologies Co., Ltd., Shenzhen (CN)

(72) Inventors: Kun Wang, Xi'an (CN); Tiansan Lin, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/716,483

(22) Filed: Apr. 8, 2022

(65) Prior Publication Data

US 2022/0329064 A1 Oct. 13, 2022

(30) Foreign Application Priority Data

Apr. 9, 2021 (CN) .......................... 202110385106.8

(51) Int. Cl.
*H02H 9/04* (2006.01)
*H01C 7/12* (2006.01)

(52) U.S. Cl.
CPC .............. *H02H 9/045* (2013.01); *H01C 7/12* (2013.01); *H02H 9/04* (2013.01); *H02H 9/042* (2013.01)

(58) Field of Classification Search
CPC ............ H02H 9/04; H02H 9/06; H02H 9/041; H02H 9/045; H02H 9/00; H01T 4/20; H01T 1/16; H01T 4/00; H01T 4/06; H01C 7/12

(Continued)

(56) References Cited

U.S. PATENT DOCUMENTS

| 8,045,314 B2 * | 10/2011 | Ibok | .......................... H05F 7/00 361/126 |
| 2008/0198527 A1 * | 8/2008 | Higashi | .................. H02H 9/042 361/118 |

(Continued)

FOREIGN PATENT DOCUMENTS

| CN | 2255691 Y | 6/1997 |
| CN | 1354540 A | 6/2002 |

(Continued)

OTHER PUBLICATIONS

Li Weihong, "Ground mobile equipment lightning protection engineering," National Defense Industry Press, 2014, with an English abstract, 4 pages.

*Primary Examiner* — Danny Nguyen
(74) *Attorney, Agent, or Firm* — Conley Rose, P.C.

(57) ABSTRACT

A lightning protection apparatus disposed in a photovoltaic power generation system includes first lightning protection units in a one-to-one correspondence with phase lines at a to-be-protected location in the photovoltaic power generation system and a second lightning protection unit connected in series to the first lightning protection units. A first terminal of each first lightning protection unit is connected to a corresponding to-be-protected phase line, and a second terminal of each first lightning protection unit is connected to a first terminal of the second lightning protection unit. A second terminal of the second lightning protection unit is connected to an earth wire. The second lightning protection unit includes at least one gas discharge tube.

20 Claims, 13 Drawing Sheets

(58) Field of Classification Search
USPC .................................................. 361/117–120
See application file for complete search history.

(56) References Cited

U.S. PATENT DOCUMENTS

| | | |
|---|---|---|
| 2009/0154034 A1 | 6/2009 | Tallam |
| 2011/0211290 A1* | 9/2011 | Fife .......................... H02H 9/04 |
| | | 361/118 |
| 2012/0140363 A1* | 6/2012 | Jeppe ................... H02H 7/1222 |
| | | 361/18 |
| 2018/0175616 A1* | 6/2018 | Schneider ................. H01T 1/14 |
| 2019/0148935 A1 | 5/2019 | Hasegawa et al. |

FOREIGN PATENT DOCUMENTS

| | | |
|---|---|---|
| CN | 201541126 U | 8/2010 |
| CN | 201846074 U | 5/2011 |
| CN | 201994657 U | 9/2011 |
| CN | 202076965 U | 12/2011 |
| CN | 205407246 U | 7/2016 |
| CN | 206226006 U | 6/2017 |
| CN | 107887899 A | 4/2018 |
| CN | 109390925 A | 2/2019 |
| CN | 208862564 U | 5/2019 |
| CN | 209217711 U | 8/2019 |
| CN | 112467705 A | 3/2021 |
| EP | 0974181 A1 | 1/2000 |
| EP | 1075064 A1 | 2/2001 |
| EP | 0974181 B1 | 1/2007 |
| EP | 3832825 A1 | 6/2021 |
| WO | 9845919 A1 | 10/1998 |

\* cited by examiner

LIGHTNING PROTECTION APPARATUS AND PHOTOVOLTAIC POWER GENERATION SYSTEM

CROSS-REFERENCE TO RELATED APPLICATION

This claims priority to Chinese Patent Application No. 202110385106.8 filed on Apr. 9, 2021, which is hereby incorporated by reference in its entirety.

TECHNICAL FIELD

This application relates to the field of power electronics technologies, and in particular, to a lightning protection apparatus and a photovoltaic power generation system.

BACKGROUND

With increasing attention to energy in today's society, a photovoltaic power generation technology is increasingly widely applied. In actual application, to ensure safe operation of a photovoltaic power generation system, a lightning protection apparatus is disposed in the photovoltaic power generation system.

Currently, in most lightning protection solutions for the photovoltaic power generation system, one or more varistors are connected between an electrical energy transmission cable and an earth wire of the photovoltaic power generation system. When a voltage on the cable suddenly increases because the photovoltaic power generation system undergoes a lightning stroke, the varistor clamps the voltage on the cable and transmits lightning energy to the earth wire through the varistor.

In actual application, a spark-over voltage value of the varistor is small. When the lightning protection apparatus is used in a high-voltage scenario, a varistor with higher costs and a higher spark-over voltage value needs to be used. In addition, when the photovoltaic power generation system is short-circuited, a voltage between two terminals of a varistor connected to a failure-free cable increases. In a serious case, the varistor is broken down, and secondary damage is caused to the photovoltaic power generation system.

In summary, a design solution for a lightning protection apparatus is urgently needed, to reduce lightning protection costs of the system and ensure safe operation of the system.

SUMMARY

This application provides a lightning protection apparatus and a photovoltaic power generation system to reduce lightning protection costs of the lightning protection apparatus and ensure safe operation of the system.

According to a first aspect, an embodiment of this application provides a lightning apparatus. The lightning apparatus may be used in a photovoltaic power generation system to perform lightning protection on the photovoltaic power generation system. Further, the lightning apparatus may include first lightning protection units in a one-to-one correspondence with phase lines at a to-be-protected location in the photovoltaic power generation system and a second lightning protection unit connected in series to the first lightning protection units.

A first terminal of each first lightning protection unit is connected to a corresponding to-be-protected phase line, and a second terminal of each first lightning protection unit is connected to a first terminal of the second lightning protection unit. A second terminal of the second lightning protection unit is connected to an earth wire. The second lightning protection unit includes at least one gas discharge tube (GDT).

In the foregoing lightning apparatus structure, the second lightning protection unit can use a GDT with lower lightning protection costs and a higher spark-over voltage value for lightning protection, to improve a spark-over voltage level of the entire lightning protection apparatus. In addition, when any phase line in the photovoltaic power generation system has a short-circuit failure, because the spark-over voltage value and an impedance value of the GDT are higher, the GDT can effectively prevent another failure-free phase line from having a short-circuit failure caused by high-voltage breakdown, thereby ensuring safe operation of the photovoltaic power generation system.

In a possible design, each first lightning protection unit includes a first varistor.

In the lightning protection apparatus, the first varistor and the second lightning protection unit can be used to perform voltage division on a voltage on the phase line, and the first varistor is connected in series to the second lightning protection unit to constitute a transmission path for transmitting lightning energy to the earth wire.

In a possible design, each first lightning protection unit includes a first branch including a plurality of second varistors connected in series.

A first terminal of the first branch constitutes the first terminal of the first lightning protection unit, and a second terminal of the first branch constitutes the second terminal of the first lightning protection unit.

In the lightning protection apparatus, when a single varistor cannot meet a lightning protection requirement of the photovoltaic power generation system, a spark-over voltage value of the first lightning protection unit can be increased by connecting a plurality of varistors in series for voltage division, to meet the lightning protection requirement of the photovoltaic power generation system.

In a possible design, each first lightning protection unit includes a first GDT.

In the lightning protection apparatus, a first GDT with a higher spark-over voltage value can be used to further improve the spark-over voltage level of the entire lightning protection apparatus.

In a possible design, each first lightning protection unit includes a second branch including a plurality of second GDTs connected in series.

A first terminal of the second branch constitutes the first terminal of the first lightning protection unit, and a second terminal of the second branch constitutes the second terminal of the first lightning protection unit.

In the lightning protection apparatus, when a single GDT cannot meet a lightning protection requirement of the photovoltaic power generation system, a spark-over voltage value of the first lightning protection unit can be increased by connecting a plurality of GDTs in series for voltage division, to meet the lightning protection requirement of the photovoltaic power generation system.

In a possible design, the second lightning protection unit includes a third GDT.

In the lightning protection apparatus, because lightning energy absorbed by the plurality of first lightning protection units needs to be transmitted to the earth wire through the second lightning protection unit, a GDT with a higher spark-over voltage value and a higher resistance value is connected between the earth wire and the first lightning protection units. This is applicable to a photovoltaic power generation system with a higher lightning protection level. In addition, because a large part of a voltage on a phase line is borne by the third GDT, a spark-over voltage value of a device in the first lightning protection unit can be effectively reduced, failures of the device in the first lightning protection unit can be reduced, and safe operation of the lightning protection apparatus can be ensured.

In a possible design, the second lightning protection unit includes a third branch including a plurality of fourth GDTs connected in series.

A first terminal of the third branch constitutes the first terminal of the second lightning protection unit, and a second terminal of the third branch constitutes the second terminal of the second lightning protection unit.

In the lightning protection apparatus, when a single GDT cannot meet a lightning protection requirement of the photovoltaic power generation system, a spark-over voltage value of the first lightning protection unit can be increased by connecting a plurality of GDTs in series for voltage division, to meet the lightning protection requirement of the photovoltaic power generation system.

In a possible design, the second lightning protection unit further includes a third varistor connected between the third GDT and the earth wire.

In the lightning protection apparatus, a GDT may cooperate with a varistor, so that while the spark-over voltage level of the lightning protection apparatus is improved by the GDT, operation sensitivity of the lightning protection apparatus is improved by using the varistor, to meet a lightning protection requirement of the photovoltaic power generation system.

In a possible design, if the phase line at the to-be-protected location transmits a direct current, the lightning protection apparatus further includes a third lightning protection unit connected in parallel to the second lightning protection unit, and the third lightning protection unit includes at least one GDT.

In the lightning protection apparatus, the photovoltaic power generation system mostly performs a lightning protection test by using a direct current cable for transmitting a direct current. The lightning protection apparatus connected to the direct current cable undergoes a plurality of lightning stroke tests. To prolong a service life of the lightning protection apparatus, the third lightning protection unit connected in parallel to the second lightning protection unit can be added. When the second lightning protection unit fails because the phase line connected to the lightning protection apparatus undergoes a lightning stroke, the third lightning protection unit can be used to transmit lightning energy, thereby effectively prolonging the service life of the lightning protection apparatus.

In a possible design, the second lightning protection unit further includes a first resistor connected in parallel to the third GDT.

In the lightning protection apparatus, a resistance value of a GDT is far greater than that of a varistor. To prevent the GDT from being damaged due to bearing a high voltage, a resistor connected in parallel to the GDT can be disposed for voltage division processing.

According to a second aspect, an embodiment of this application provides a photovoltaic power generation system. The photovoltaic power generation system may include a plurality of photovoltaic components, a direct current to direct current (DC/DC) converter, a direct current to alternating current (DC/AC) converter, and the first lightning protection apparatus provided in the first aspect and any possible design of the first aspect in embodiments of this application.

Output terminals of the plurality of photovoltaic components are connected to an input terminal of the DC/DC converter; an output terminal of the DC/DC converter is connected to an input terminal of the DC/AC converter; and an output terminal of the DC/AC converter is connected to the first lightning protection apparatus.

In the photovoltaic power generation system, a lightning protection apparatus with lower costs can be used to perform lightning protection on the DC/AC converter.

In a possible design, the system further includes second lightning protection apparatuses in a one-to-one correspondence with the plurality of photovoltaic components.

Each second lightning protection apparatus is connected to an output terminal of a corresponding photovoltaic component.

In a possible design, the system further includes a third lightning protection apparatus connected to the output terminal of the DC/DC converter.

DESCRIPTION OF EMBODIMENTS

To make the objectives, technical solutions, and advantages of this application clearer, the following further describes this application in detail with reference to the accompanying drawings.

A specific operation method in a method embodiment may also be applied to an apparatus embodiment or a system embodiment. It should be noted that, in description of this application, "at least one" means one or more, and "a plurality of" means two or more. In view of this, "a plurality of" may also be understood as "at least two" in embodiments of the present disclosure. The term "and/or" describes an association relationship for describing associated objects and represents that three relationships may exist. For example, A and/or B may represent the following three cases: Only A exists, both A and B exist, and only B exists. In addition, the character "/" usually indicates an "or" relationship between the associated objects unless otherwise specified. In addition, it should be understood that, in the description of this application, terms such as "first" and "second" are used only for distinguishing between descriptions, but cannot be understood as an indication or implication of relative importance, and cannot be understood as an indication or implication of a sequence.

It should be noted that the "connection" in embodiments of this application is an electric connection, and the connection between two electrical elements may be a direct or indirect connection between the two electrical elements. For example, a connection between A and B may represent that A and B are directly connected to each other, or A and B are indirectly connected to each other by using one or more other electrical elements. For example, the connection between A and B may also represent that A is directly connected to C, C is directly connected to B, and A and B are connected to each other through C.

For ease of description, the following describes an application scenario of a lightning protection apparatus in embodiments of this application.

Figure 1:
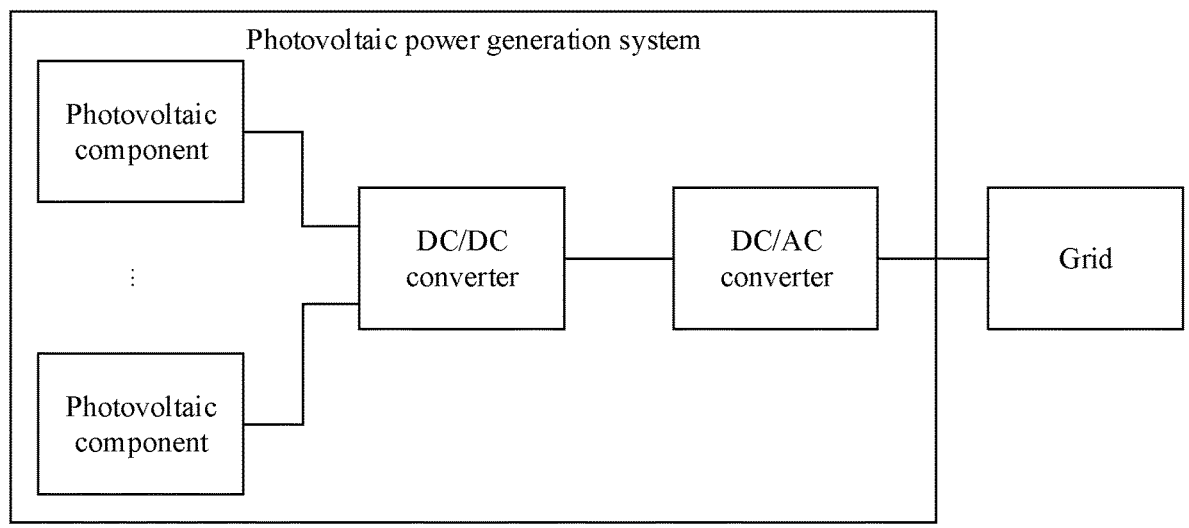
FIG. 1 is a schematic diagram 1 of a structure of a photovoltaic power generation system according to an embodiment of this application.

A lightning apparatus provided in an embodiment of this application may be used in a photovoltaic power generation system. FIG. 1 is a possible schematic diagram of a structure of the photovoltaic power generation system. Refer to FIG. 1, the photovoltaic power generation system includes a plurality of photovoltaic components, a DC/DC converter, and a DC/AC converter. Output terminals of the plurality of photovoltaic components are all connected to an input terminal of the DC/DC converter, an output terminal of the DC/DC converter is connected to an input terminal of the DC/AC converter, and an output terminal of the DC/AC converter is connected to a grid. The lightning apparatus may be disposed on a direct current cable for transmitting a direct current and an alternating current cable used for transmitting an alternating current that are in the photovoltaic power generation device, to perform lightning protection on the direct current cable and the alternating current cable, and ensure operation safety of the photovoltaic power generation system.

Figure 2:
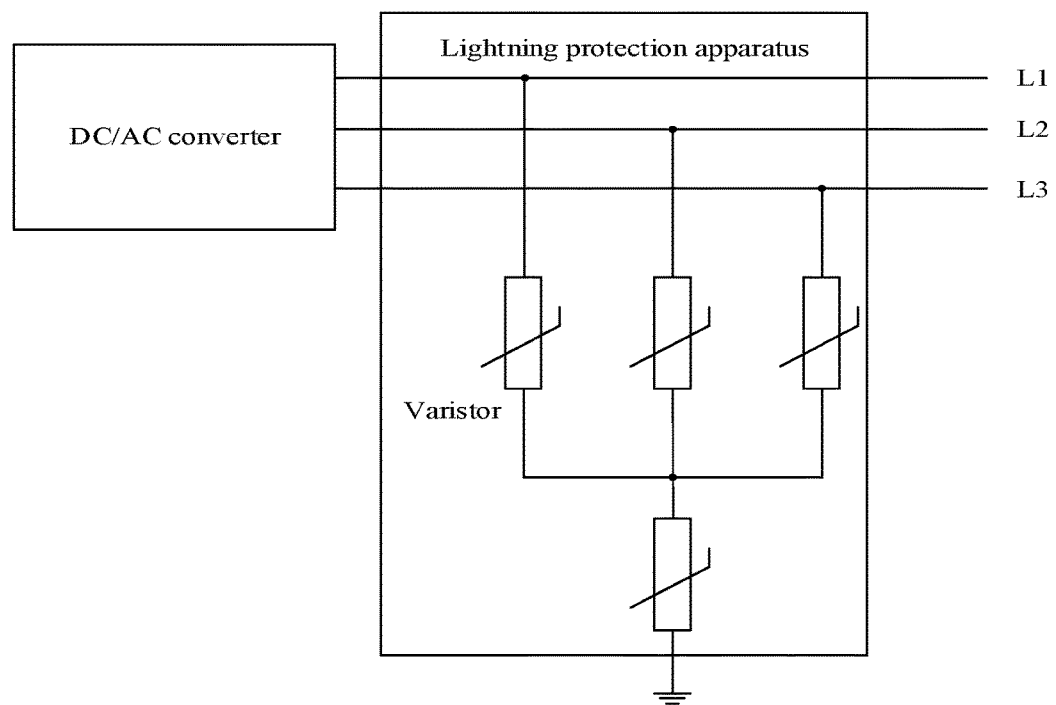
FIG. 2 is a schematic diagram 1 of a structure of a lightning protection apparatus according to an embodiment of this application.

Alternating current cables for outputting three-phase alternating currents at output terminals of a DC/AC converter are used as an example. For example, FIG. 2 shows a schematic diagram of a structure of a lightning protection apparatus connected to the output terminals of the DC/AC converter. As shown in FIG. 2, three phase lines L1, L2, and L3 at the output terminals of the DC/AC converter each are connected to one varistor, and three varistors connected to the three phase lines are all connected to an earth wire by using one varistor. When the DC/AC converter works normally, a voltage of each phase line is divided by the two varistors connected between the phase line and the earth wire. When the DC/AC converter undergoes a lightning stroke, lightning energy causes voltages on the phase lines L1, L2, and L3 to rise. When voltages borne by two terminals of each varistor exceed operating voltages of the varistors, the varistors start to work, the voltages on the phase lines L1, L2, and L3 are clamped, transmission paths between the phase lines and the earth wire are formed, and the lightning energy is transmitted to the earth wire through the transmission paths.

Figure 3:
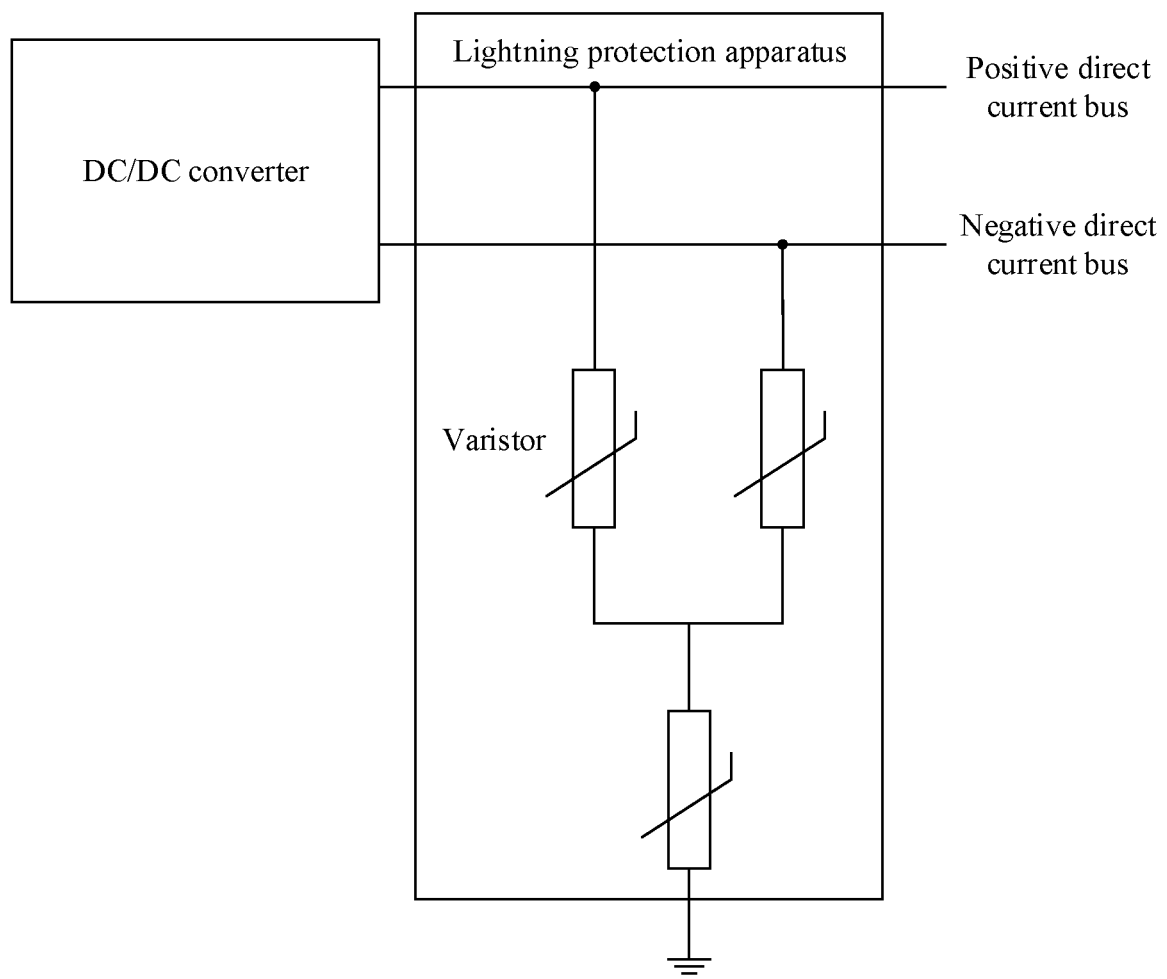
FIG. 3 is a schematic diagram 2 of a structure of a lightning protection apparatus according to an embodiment of this application.

Direct current cables for outputting direct currents at output terminals of a DC/DC converter are used as an example. For example, FIG. 3 shows a schematic diagram of a structure of a lightning protection apparatus connected to the output terminals of the DC/DC converter. As shown in FIG. 3, two phase lines, namely, a positive direct current bus and a negative direct current bus, at the output terminals of the DC/DC converter each are connected to one varistor, and varistors connected to the positive direct current bus and the negative direct current bus are all connected to the earth wire by using one varistor. When the DC/DC converter works normally, a voltage of each phase line is divided by the two varistors connected between the phase line and the earth wire. When the DC/DC converter undergoes a lightning stroke, lightning energy causes voltages on the phase lines L1, L2, and L3 to rise. When voltages borne by two terminals of each varistor exceed operating voltages of the varistors, the varistors start to work, the voltages on the positive direct current bus and the negative direct current bus are clamped, transmission paths between the phase lines and the earth wire are formed, and the lightning energy is transmitted to the earth wire through the transmission paths.

FIG. 2 and FIG. 3 separately show connection manners of a lightning protection apparatus on a direct current cable and an alternating current cable. To be specific, an existing lightning protection apparatus mostly uses varistors to perform lightning protection. A specific specification of the varistor needs to be set based on an operating voltage of a photovoltaic power generation system and a lightning protection requirement of the system. For a photovoltaic power generation system with a higher operating voltage, a higher withstand voltage level of a varistor indicates higher costs of the varistor.

In view of this, embodiments of this application provide a lightning protection apparatus and a photovoltaic power generation system, which may be applied to the photovoltaic power generation system shown in FIG. 1, to reduce lightning protection costs of the photovoltaic power generation system and ensure normal running of the photovoltaic power generation system.

Figure 4:
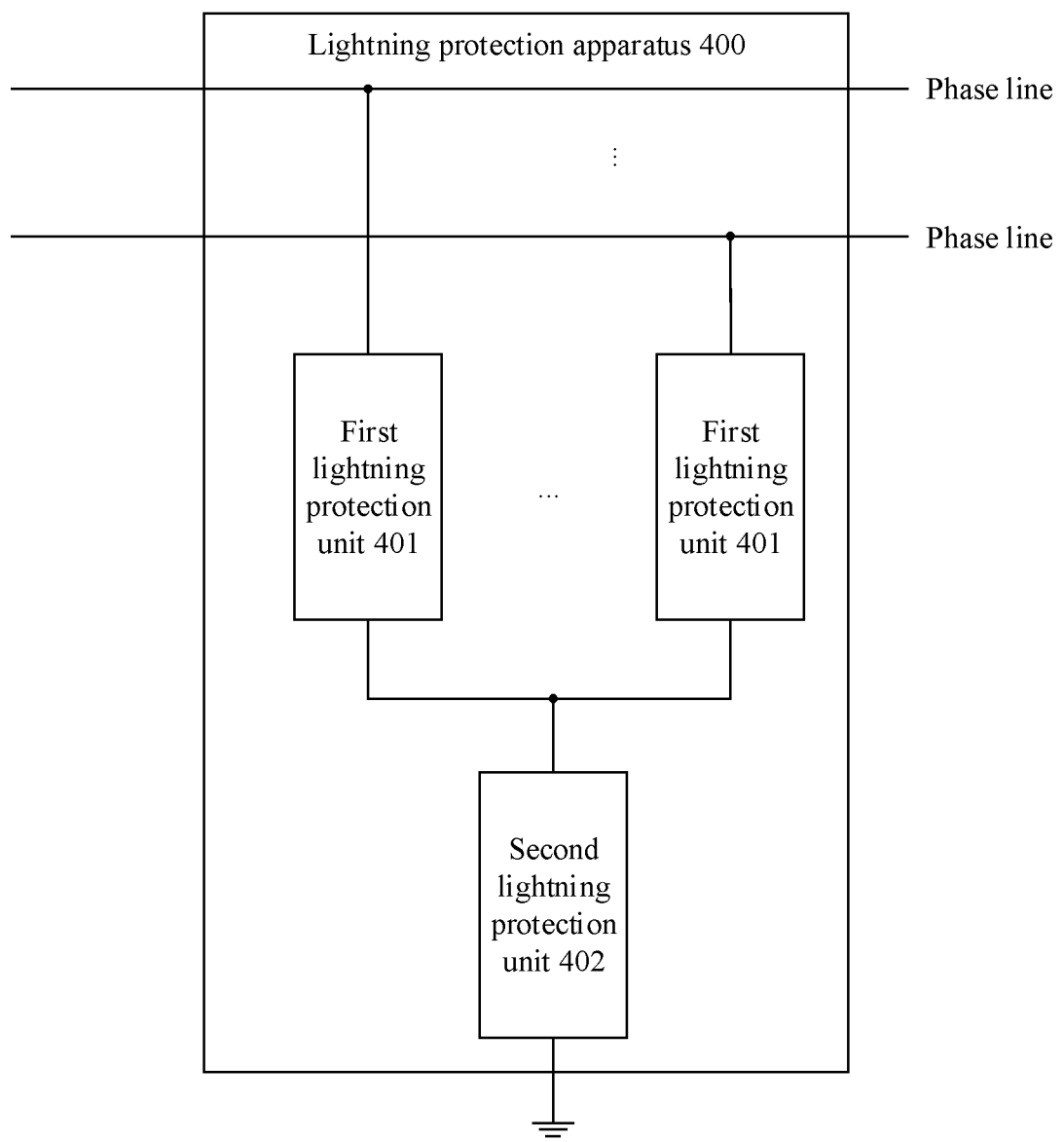
FIG. 4 is a schematic diagram 3 of a structure of a lightning protection apparatus according to an embodiment of this application.

FIG. 4 is a schematic diagram of a structure of a lightning protection apparatus according to an embodiment of this application. As shown in FIG. 4, the lightning protection apparatus 400 mainly includes first lightning protection units 401 in a one-to-one correspondence with phase lines at a to-be-protected location in a photovoltaic power generation system and a second lightning protection unit 402 connected in series to the first lightning protection units 401.

A first terminal of each first lightning protection unit 401 is connected to a corresponding phase line at the to-be-protected location, and a second terminal of each first lightning protection unit 401 is connected to a first terminal of the second lightning protection unit 402. A second terminal of the second lightning protection unit 402 is connected to an earth wire. The second lightning protection unit 402 includes at least one GDT.

When the lightning protection apparatus 400 is configured to perform lightning protection on the photovoltaic power generation system, if the photovoltaic power generation system undergoes a lightning stroke, lightning energy exists on the phase line at the to-be-protected location. The lightning energy makes values of a voltage and a current on the phase line increase and exceed a preset threshold. In this case, the first lightning protection unit 401 and the second lightning protection unit 402 operate to clamp the voltage on the phase line, and constitute an electrical energy transmission path between the phase line and the earth wire. An excessive current on the phase line is transmitted to the earth wire through the electrical energy transmission path, so that the lightning energy is released, thereby effectively preventing the lightning energy from damaging a device in the system, and ensuring safe operation of the photovoltaic power generation system.

The lightning protection apparatus 400 provided in this embodiment of this application has an advantage of low lightning protection costs. Further, the first lightning protection unit 401 and the second lightning protection unit 402 are connected in series, to perform voltage division processing on the voltage on the phase line. Because the second lightning protection unit 402 uses a GDT with lower costs, a higher spark-over voltage value, and a higher impedance value, the second lightning protection unit 402 is not damaged when bearing a high voltage. This improves a spark-over voltage level of the lightning protection apparatus 400 without increasing costs of the lightning protection apparatus 400, and is applicable to a photovoltaic power generation system with a higher operating voltage.

It should be understood that because the second lightning protection unit 402 uses the GDT with a higher impedance value, when a voltage between a failure-free phase line and the earth wire increases because any phase line connected to the lightning protection apparatus 400 has a short-circuit failure, a high impedance of the GDT may effectively prevent the failure-free phase line from being short-circuited due to high-voltage breakdown, prevent the photovoltaic power generation system from secondary damage, and ensure safe operation of the photovoltaic power generation system.

Figure 5:
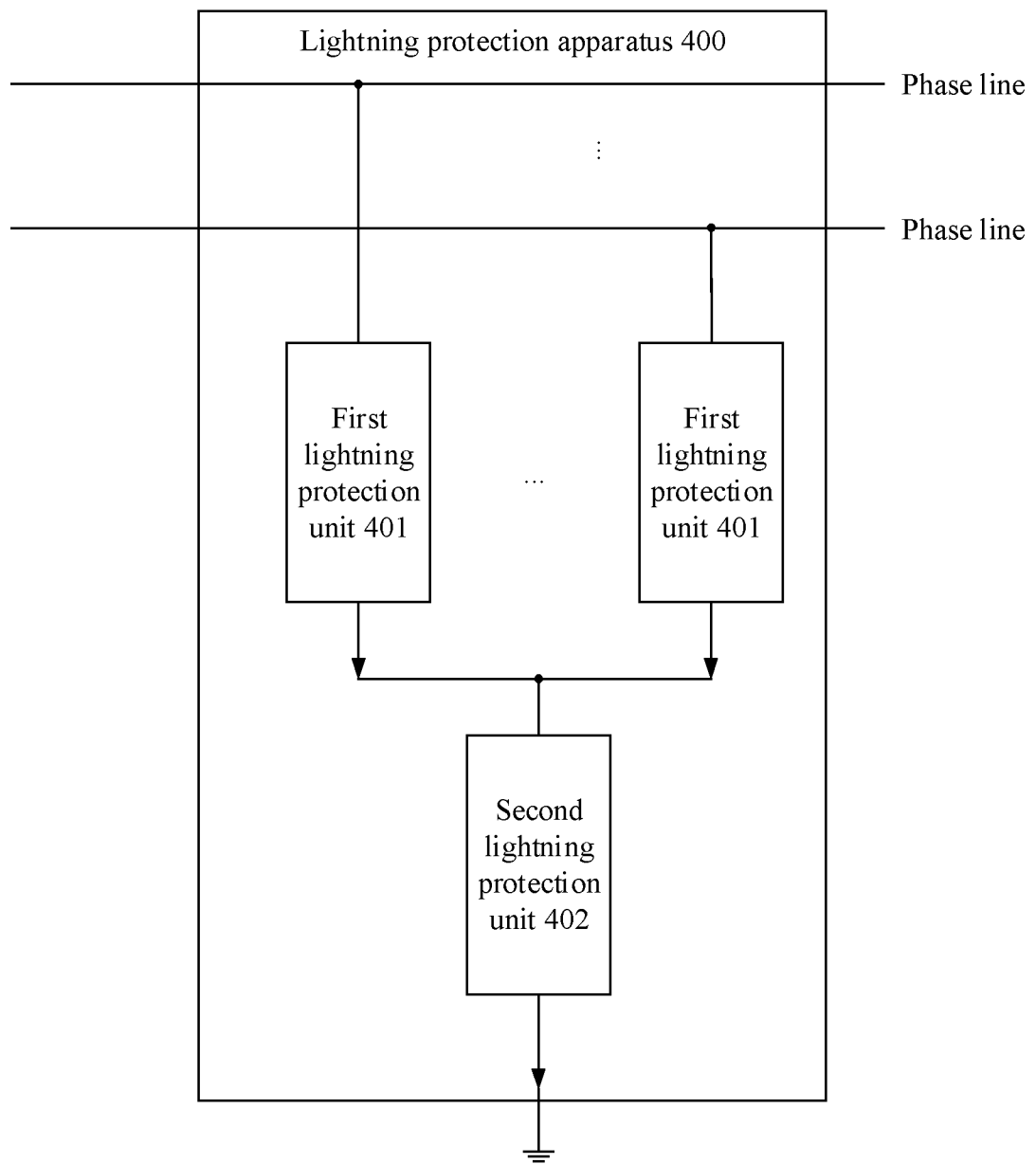
FIG. 5 is a schematic diagram of lightning energy transmission according to an embodiment of this application.

Further, when the lightning protection apparatus 400 is used to perform lightning protection on the to-be-protected location in the photovoltaic power generation system, a lightning energy transmission equivalent circuit of the lightning protection apparatus 400 may be shown in FIG. 5. In this case, an endpoint that is of each first lightning protection unit 401 and that is connected to the phase line is used as an input terminal of the lightning protection apparatus 400, an endpoint that is of the second lightning protection unit 402 and that is connected to the earth wire is used as an output of the lightning protection apparatus 400, and energy is transmitted from top to bottom.

In a possible implementation, the to-be-protected location of the photovoltaic power generation system may be an output terminal of a photovoltaic component, an output terminal of a DC/DC converter, or an output terminal of a DC/AC converter.

In a possible implementation, if the to-be-protected location is the output terminal of the DC/DC converter in the photovoltaic power generation system, the lightning apparatus further includes a third lightning protection unit connected in parallel to the second lightning protection unit, and the third lightning protection unit includes at least one GDT.

It should be understood that, because the photovoltaic power generation system converts a generated direct current into an alternating current for outputting, when a direct current cable undergoes a lightning stroke, a lightning protection apparatus connected to the direct current cable operates first, and releases a large part of lightning energy to the earth wire. In this case, only a small part of lightning energy reaches an alternating current cable. To be specific, the lightning protection apparatus connected to the direct current cable releases the large part of lightning energy, and a lightning protection apparatus connected to the alternating current cable releases only the small part of lightning energy. To improve a service life of the lightning protection apparatus connected to the direct current cable, the third lightning protection unit configured to be connected in parallel to the second lightning protection unit 402 is added to the lightning protection apparatus 400 connected to the direct current cable. The third lightning protection unit includes at least one GDT.

In actual use, when a device in the second lightning protection unit 402 is damaged, lightning energy on the phase line is transmitted to the earth wire through the first lightning protection unit 401 and the third lightning protection unit.

In a possible implementation, a structure of the third lightning protection unit is the same as a structure of the second lightning protection unit 402.

In actual application, the lightning protection apparatus 400 may be fastened onto the photovoltaic power generation system, and the lightning protection apparatus 400 may be connected to the phase line at the to-be-protected location through a fixed interface on the photovoltaic power generation system. In another implementation, the lightning protection apparatus 400 may be alternatively disposed in a flexible and detachable form. To be specific, a pluggable interface is disposed on the photovoltaic power generation system, so that the phase line at the to-be-protected location is connected to the lightning protection apparatus 400. In this case, the lightning protection apparatus 400 may be considered as an apparatus independent of the photovoltaic power generation system.

The following describes specific structures of the first lightning protection unit 401 and the second lightning protection unit 402 in the lightning protection apparatus 400.

1. First Lightning Protection Unit 401

The first terminal of each first lightning protection unit 401 is connected to the corresponding phase line at the to-be-protected location, the second terminal of each first lightning protection unit 401 is connected to the first terminal of the second lightning protection unit 402, and each first lightning protection unit 401 may be configured to clamp a voltage on the connected phase line when a voltage between the two terminals of the first lightning protection unit 401 is greater than an operating voltage of a device in the first lightning protection unit 401.

A function of disposing the plurality of first lightning protection units 401 is as follows: When the photovoltaic power generation system undergoes a lightning stroke, lightning energy may exist on a plurality of phase lines at the to-be-protected location. The first lightning protection units 401 connected to each phase line and the second lightning protection unit 402 may be configured to constitute a lightning energy transmission path between each phase line and the earth wire, to transmit the lightning energy to the earth wire through the lightning energy transmission path, thereby implementing lightning protection of each phase line at the to-be-protected location.

It can be learned that the lightning protection apparatus 400 implements a Y-type connection by using the plurality of first lightning protection units 401.

In a possible implementation, the first lightning protection unit 401 may include a first GDT connected to a corresponding phase line at the to-be-protected location.

In actual use, if a spark-over voltage value of the first GDT cannot meet a spark-over voltage level requirement at the to-be-protected location, the first lightning protection unit 401 may include a second branch including a plurality of second GDTs connected in series.

A first terminal of the second branch constitutes the first terminal of the first lightning protection unit 401, and a second terminal of the second branch constitutes the second terminal of the first lightning protection unit 401.

It should be understood that, as described above, the second lightning protection unit 402 may effectively improve the spark-over voltage level of the lightning protection apparatus 400 by using a GDT, and the first lightning protection unit 401 may further improve the spark-over voltage level of the lightning protection apparatus 400 by using a GDT.

In a possible implementation, the first lightning protection unit 401 may include a first varistor connected to a corresponding phase line at the to-be-protected location.

If a spark-over voltage value of the first varistor cannot meet a spark-over voltage level requirement at the to-be-protected location, the first lightning protection unit 401 may include a first branch including a plurality of second varistors connected in series.

A first terminal of the first branch constitutes the first terminal of the first lightning protection unit 401, and a second terminal of the first branch constitutes the second terminal of the first lightning protection unit 401.

It should be understood that, as described above, the second lightning protection unit 402 may effectively improve the spark-over voltage level of the lightning protection apparatus by using a GDT. However, operation sensitivity of the GDT is low, and when lightning energy exists on a connected phase line, the GDT cannot be timely started to operate to perform lightning protection on the to-be-protected location. The first lightning protection unit 401 may be used together with the GDT in the second lightning protection unit 402 by using a varistor, to improve sensitivity of the lightning protection apparatus 400 while reducing lightning protection costs of the lightning protection apparatus 400.

For ease of understanding, the following provides specific examples of two structures of the first lightning protection unit 401.

Figure 6:
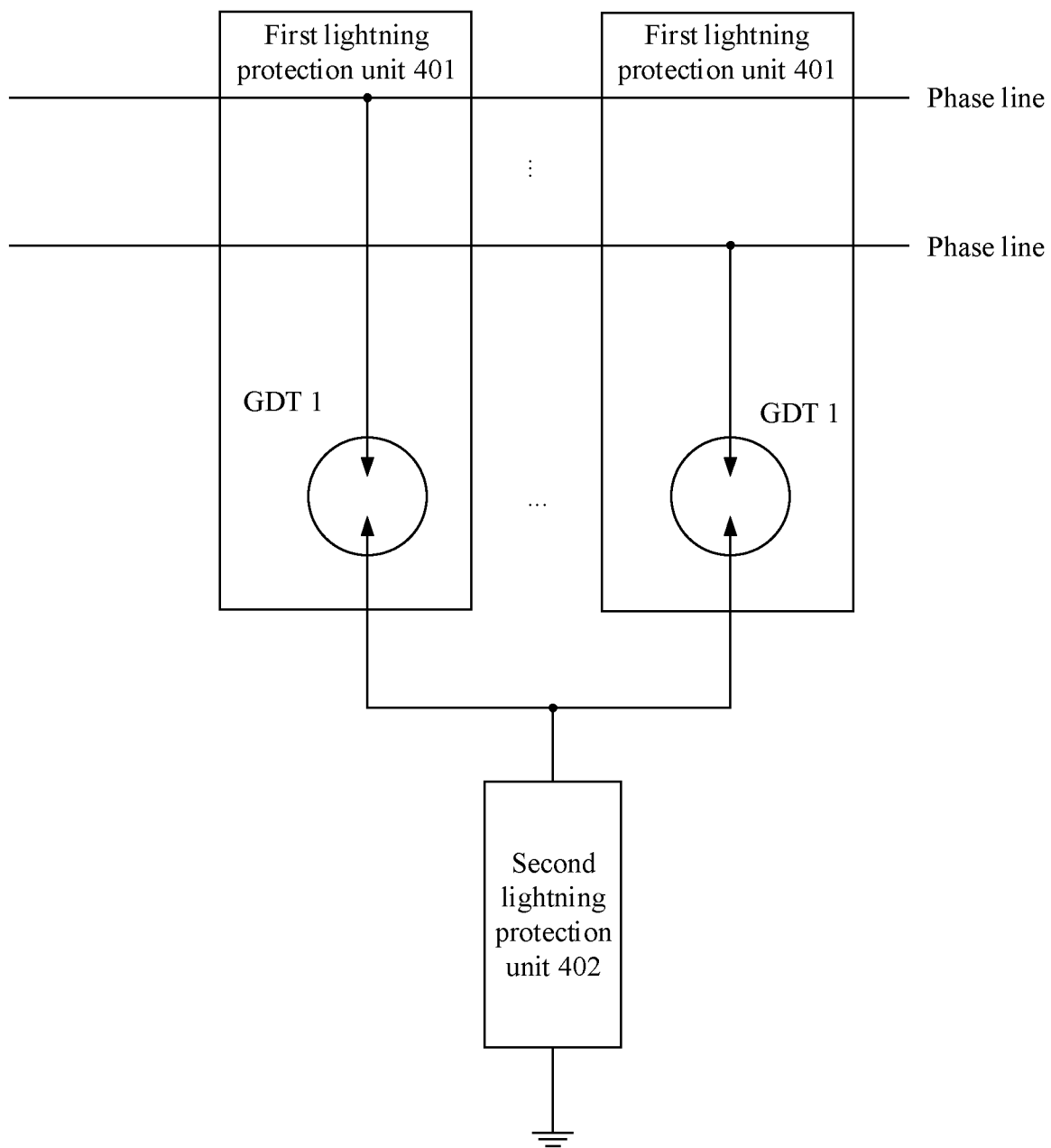
FIG. 6 is a schematic diagram 1 of a structure of a first lightning protection unit according to an embodiment of this application.

FIG. 6 is a schematic diagram of a structure of the first lightning protection unit 401 according to an embodiment of this application. In FIG. 6, a GDT 1 may be considered as a first GDT, a port A may be considered as an input terminal of the first lightning protection unit 401, and a port B may be considered as an output terminal of the first lightning protection unit 401.

A connection relationship of devices in the first lightning protection unit 401 shown in FIG. 6 may be that a first terminal of the GDT 1 is connected to the phase line corresponding to the first lightning protection unit 401, and a second terminal of the GDT 1 is connected to the first terminal of the second lightning protection unit 402.

When lightning protection is performed on the corresponding phase line at the to-be-protected location by using the first lightning protection unit 401 shown in FIG. 6, the GDT 1 and the second lightning protection unit 402 perform voltage division on the connected phase line. When lightning energy occurs on the phase line, the lightning energy causes both a voltage and a current on the phase line to be increased. When a voltage borne by the two terminals of the GDT 1 is greater than an operating voltage of the GDT 1, the GDT 1 clamps the voltage on the connected phase line, and transmits an excessive current on the phase line to the earth wire through the second lightning protection unit 402. The excessive current is a current part on the phase line that exceeds an operating current.

Figure 7:
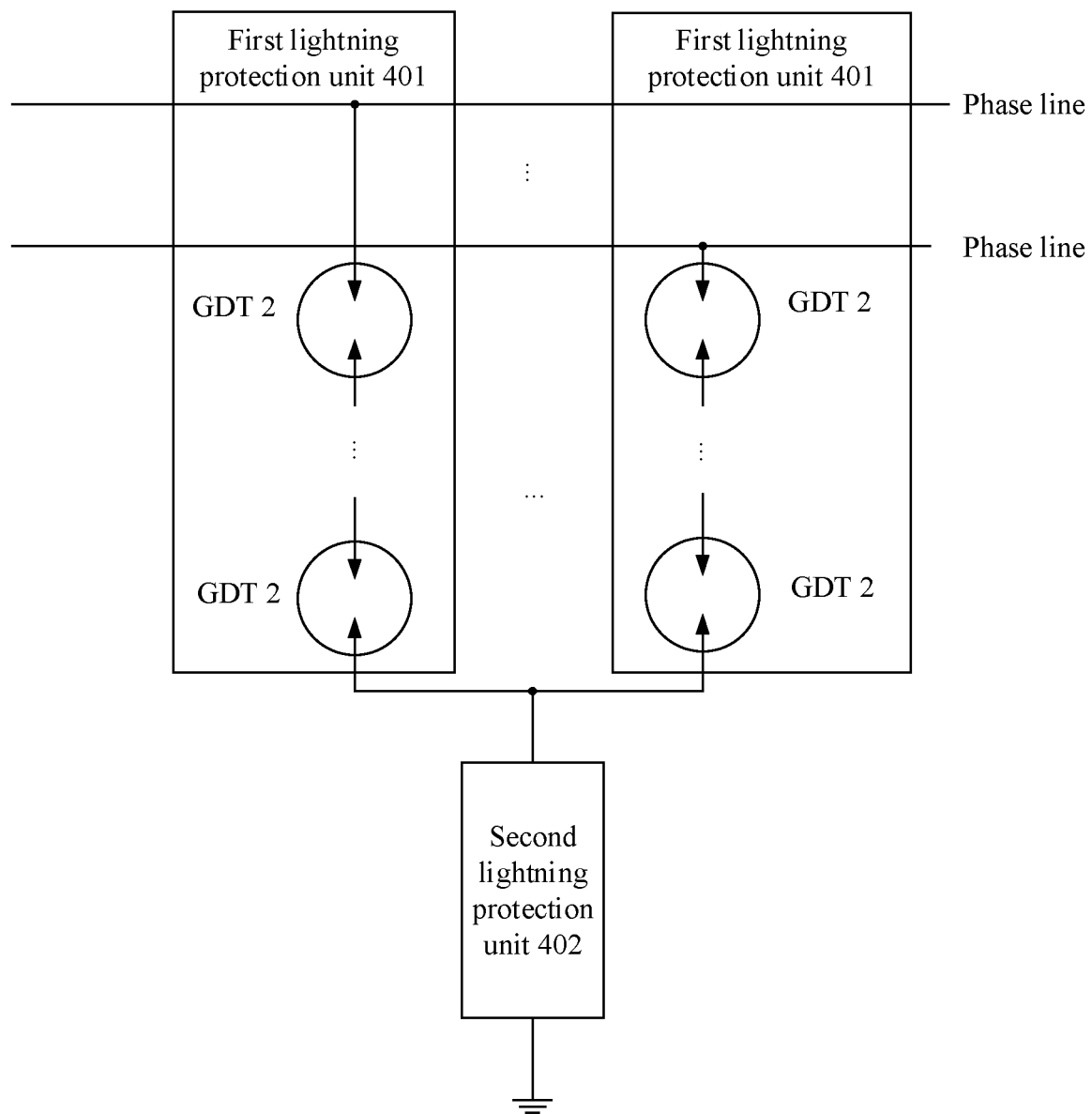
FIG. 7 is a schematic diagram 2 of a structure of a first lightning protection unit according to an embodiment of this application.

In actual use, when a spark-over voltage value of the GDT 1 cannot meet a spark-over voltage requirement of the phase line at the to-be-protected location, as shown in FIG. 7, the first lightning protection unit may use a plurality of GDTs 2 connected in series, to meet the spark-over voltage requirement at the to-be-protected location.

Figure 8:
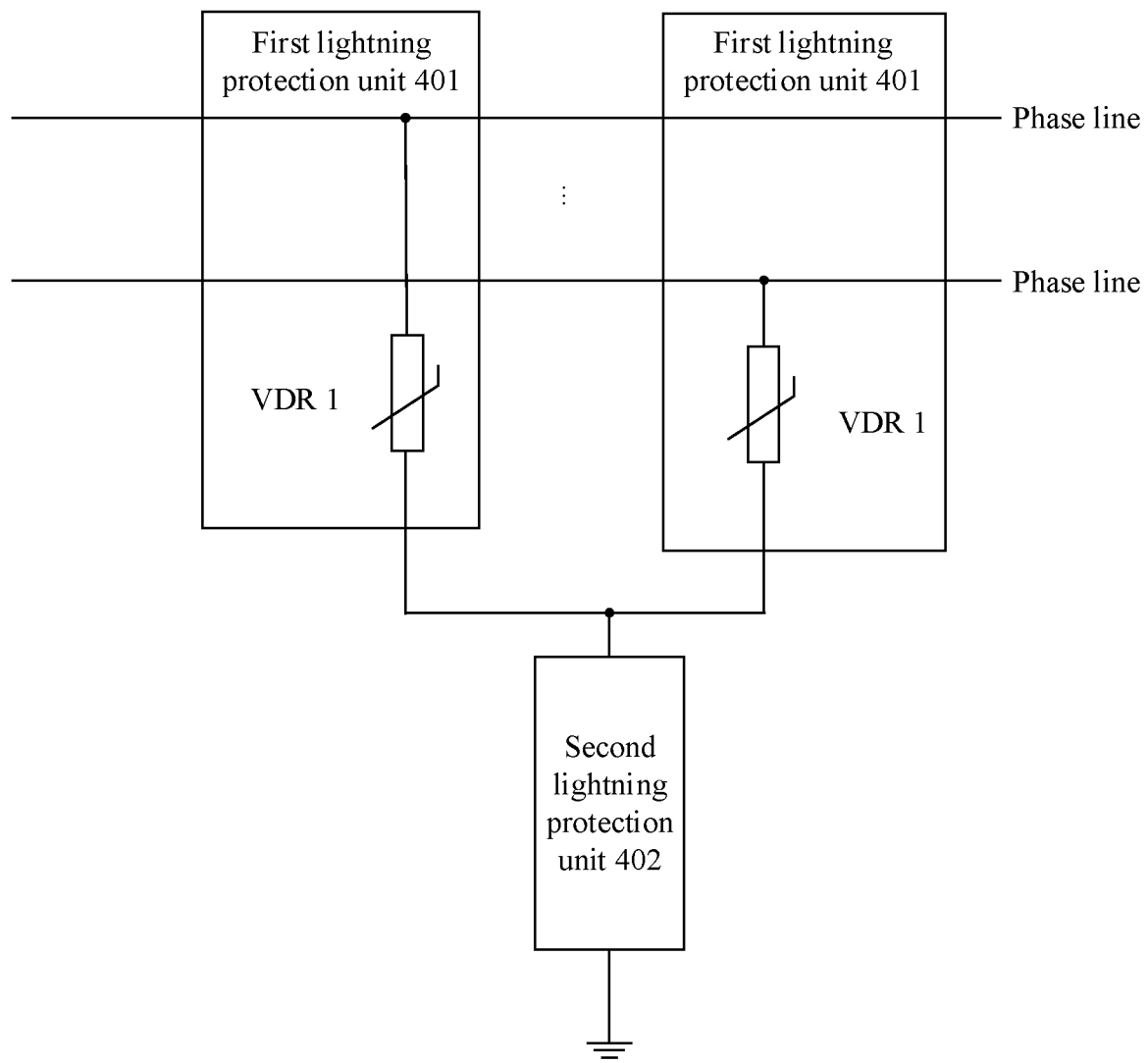
FIG. 8 is a schematic diagram 3 of a structure of a first lightning protection unit according to an embodiment of this application.

FIG. 8 is a schematic diagram of another structure of the first lightning protection unit 401 according to an embodiment of this application. In FIG. 8, a voltage-dependent resistor (VDR) 1 may be considered as a first varistor, a port A may be considered as an input terminal of the first lightning protection unit 401, and a port B may be considered as an output terminal of the first lightning protection unit 401.

A connection relationship of devices in the first lightning protection unit 401 shown in FIG. 8 may be that a first terminal of the VDR 1 is connected to the phase line corresponding to the first lightning protection unit, and a second terminal of the VDR 1 is connected to the first terminal of the second lightning protection unit 402.

When lightning protection is performed on the corresponding phase line by using the first lightning protection unit shown in FIG. 8, the VDR 1 and the second lightning protection unit perform voltage division on the connected phase line. When lightning energy occurs on the phase line, both a voltage and a current on the phase line increase. When a voltage between the two terminals of the VDR 1 is greater than an operating voltage of the VDR 1, the VDR 1 clamps the voltage on the connected phase line, and transmits an excessive current on the phase line to the earth wire through the second lightning protection unit. The excessive current is a current part on the phase line that exceeds an operating current.

Figure 9:
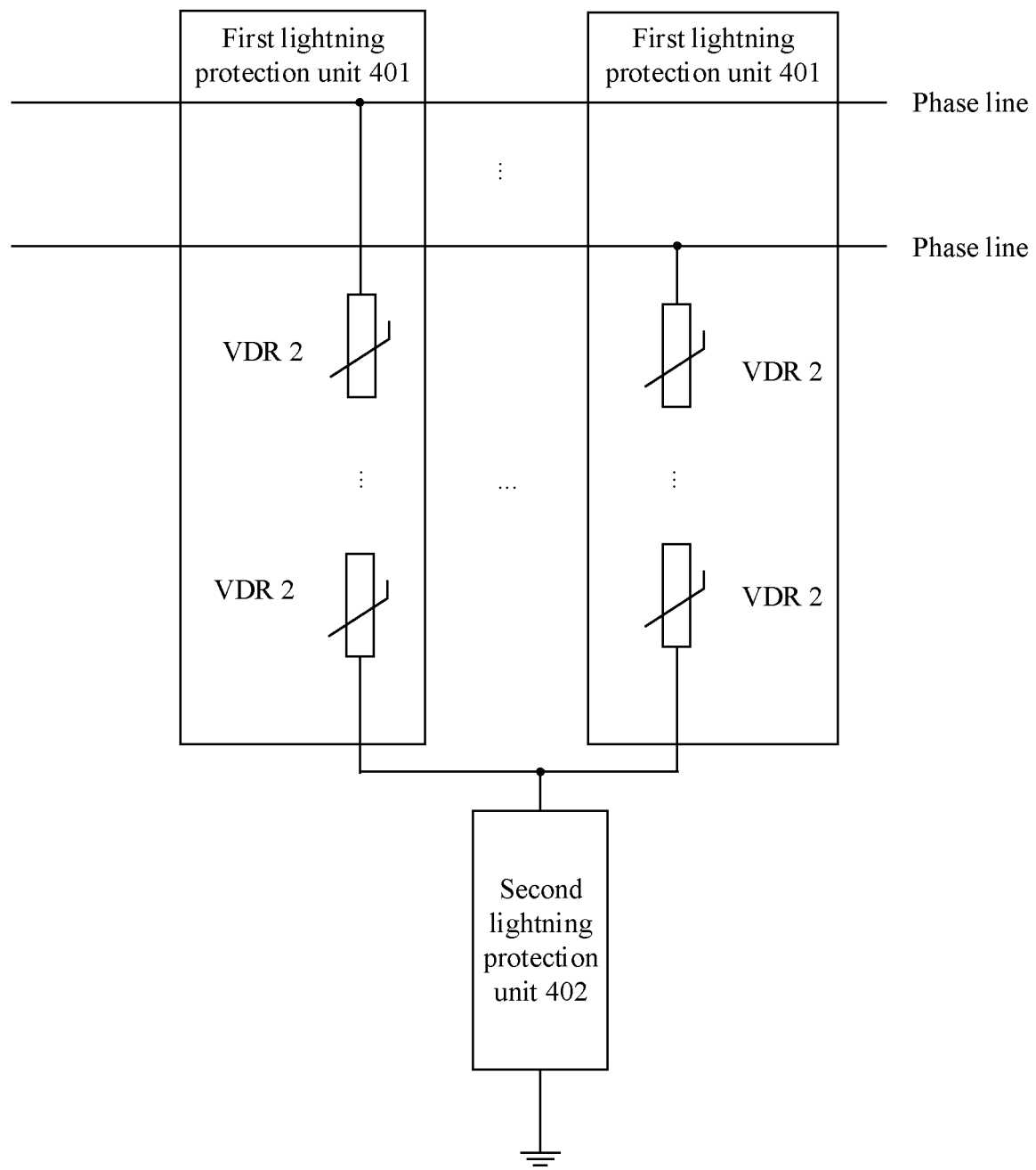
FIG. 9 is a schematic diagram 4 of a structure of a first lightning protection unit according to an embodiment of this application.

In actual use, when a spark-over voltage value of the VDR 1 cannot meet a spark-over voltage requirement of the phase line at the to-be-protected location, as shown in FIG. 9, the first lightning protection unit may use a plurality of second varistors VDR 2 connected in series, to meet the spark-over voltage requirement at the to-be-protected location.

Certainly, the foregoing descriptions of the structures of the first lightning protection unit 401 are merely examples. In actual application, the first lightning protection unit 401 may alternatively use another structure. For example, the first lightning protection unit 401 may include a transient suppression diode, and the transient suppression diode clamps the voltage on the connected phase line.

2. Second Lightning Protection Unit 402

The first terminal of the second lightning protection unit 402 is separately connected to second terminals of the plurality of first lightning protection units 401, the second terminal of the second lightning protection unit 402 is connected to the earth wire, and the second lightning protection unit 402 is configured to constitute an electrical energy transmission path between a phase line and the earth wire with the first lightning protection unit 401, and transmit lightning energy on the phase line connected to the first lightning protection unit 401 to the earth wire through the electrical energy transmission path.

In a possible implementation, the second lightning protection unit 402 includes a second GDT connected between the first lightning protection unit 401 and the earth wire.

In actual use, if a spark-over voltage value of the second GDT cannot meet a spark-over voltage requirement at the to-be-protected location, the second lightning protection unit may include a third branch including a plurality of second GDTs connected in series.

A first terminal of the third branch constitutes the first terminal of the second lightning protection unit 402, and a second terminal of the third branch constitutes the second terminal of the second lightning protection unit 402.

It should be understood that the second lightning protection unit 402 may use a single GDT or a plurality of GDTs connected in series. Because the GDT has a high impedance and a high spark-over voltage value, when a voltage and a current on the phase line increase because lightning energy occurs on the phase line, a large part of the voltage on the phase line is borne by a device in the second lightning protection unit 402, to reduce a voltage between two terminals of a device in the first lightning protection unit 401. This can prevent the first lightning protection unit 401 from being damaged while improving a spark-over voltage level of the lightning protection apparatus 400.

In actual use, to improve action sensitivity of the second lightning protection unit 402, the second lightning protection unit 402 further includes a third varistor connected between the third GDT and the earth wire.

It should be understood that an impedance value of a GDT in the second lightning protection unit 402 is greater than that of a varistor. When the first lightning protection unit 401 and the second lightning protection unit are connected in series to perform voltage division on the voltage on the phase line, a large part of the voltage is divided to two terminals of the GDT, and a voltage between two terminals of the varistor is close to zero. When the voltage between the two terminals of the varistor is excessively low, the varistor cannot be started to operate. To prevent start sensitivity of the lightning protection apparatus 400 from being affected, a first resistor may be connected in parallel to the two terminals of the GDT, to reduce a value of a voltage borne by the two terminals of the GDT.

Certainly, the foregoing description of the structure of the second lightning protection unit 402 is merely an example. In actual application, the second lightning protection unit 402 may alternatively use another structure. For example, the first lightning protection unit 401 may include a GDT and a transient suppression diode, and the transient suppression diode and the GDT are connected in series to clamp the voltage on the phase line.

Figure 10:
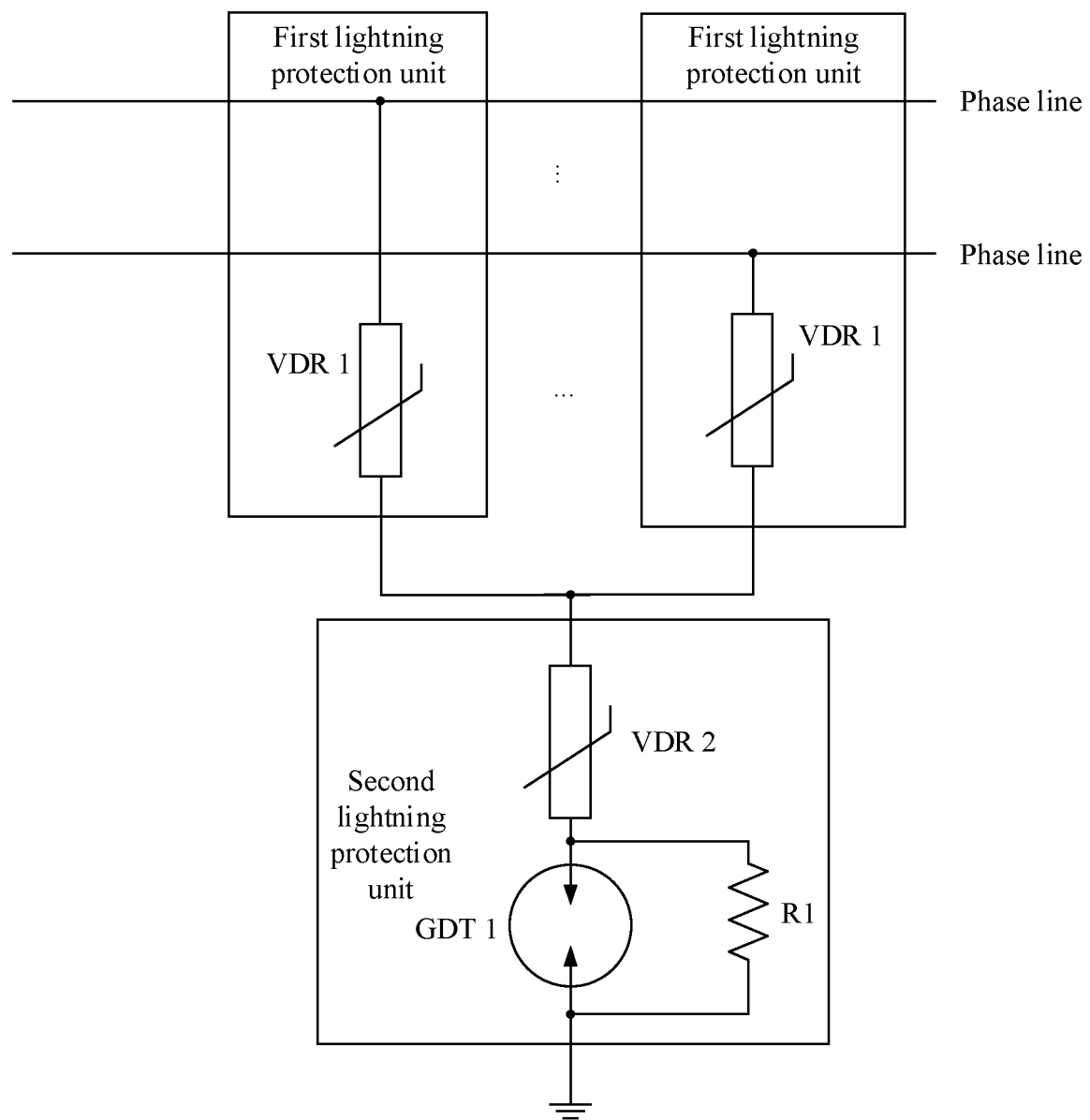
FIG. 10 is a schematic diagram 4 of a structure of a lightning protection apparatus according to an embodiment of this application.

With reference to the foregoing descriptions, for example, a lightning protection apparatus provided in embodiments of this application may be shown in FIG. 10.

A first lightning protection unit includes a first varistor VDR 1. A first terminal of the VDR 1 is connected to a corresponding phase line at a to-be-protected location, and a second terminal of the VDR 1 is connected to a first terminal of a second lightning protection unit.

The second lightning protection unit includes a second varistor VDR 2, a first GDT 1, and a first resistor R1. A first terminal of the VDR 2 is connected to the second terminal of the VDR 1. A second terminal of the VDR 2 is connected to a first terminal of the GDT 1. A second terminal of the GDT 1 is connected to an earth wire. The R1 is connected in parallel to the GDT 1.

When lightning protection is performed at the to-be-protected location by using the lightning protection apparatus shown in FIG. 10, the VDR 1, the VDR 2, and the GDT 1 each share a part of a voltage on the phase line. When the voltage and a current on the phase line increase due to lightning energy, a voltage shared by two terminals of each of the VDR 1, the VDR 2, and the GDT 1 reaches an operating voltage. In this case, the VDR 1, the VDR 2, and the GDT 1 clamp the voltage on the phase line, and transmit an excessive current to the earth wire through a conduction path constituted by the VDR 1, the VDR 2, and the GDT 1.

It should be understood that when any phase line at the to-be-protected location is short-circuited, because the GDT 1 has a high spark-over voltage value and is in a high-impedance state, a risk that the GDT 1 is broken down due to a high voltage can be effectively avoided, and secondary damage can be avoided.

Figure 11:
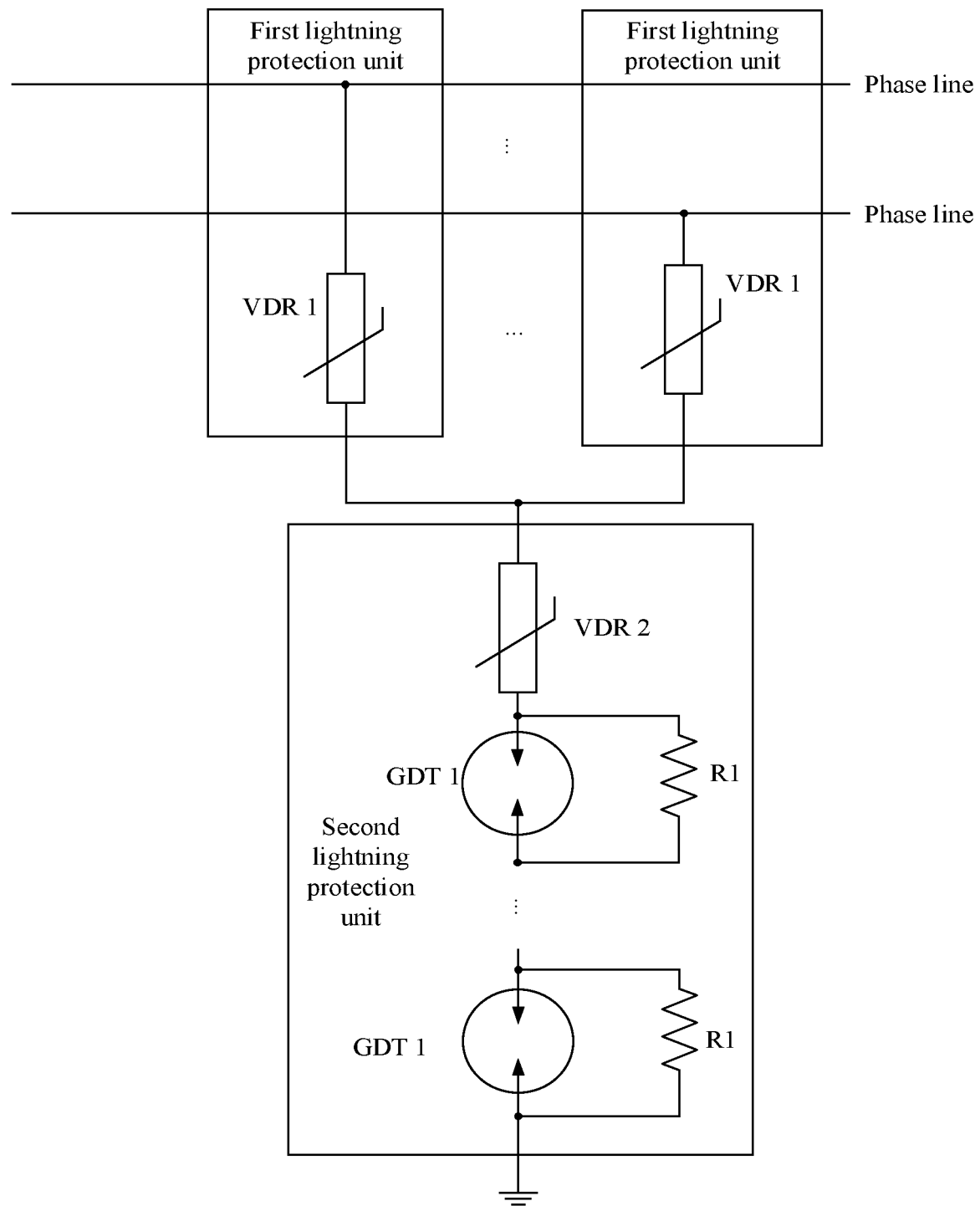
FIG. 11 is a schematic diagram 5 of a structure of a lightning protection apparatus according to an embodiment of this application.

In actual use, when spark-over voltage values of the VDR 1, the VDR 2, and the GDT 1 cannot meet a lightning protection level requirement of the phase line, refer to FIG. 11, a quantity of GDTs connected in series to the VDR 2 may be increased in the second lightning protection unit.

Figure 12:
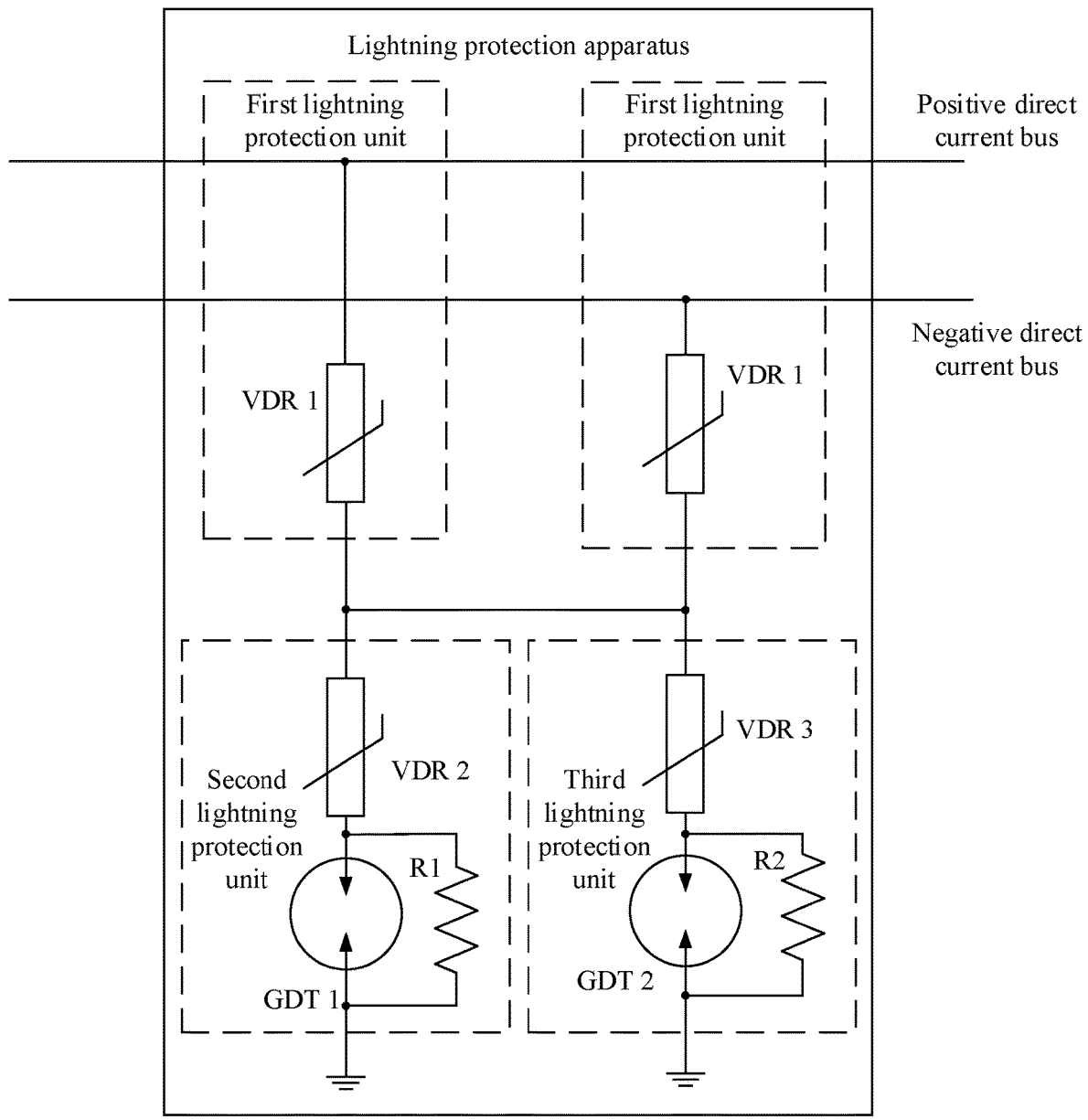
FIG. 12 is a schematic diagram 6 of a structure of a lightning protection apparatus according to an embodiment of this application.

With reference to the foregoing descriptions, for example, another lightning protection apparatus provided in embodiments of this application may be shown in FIG. 12.

A first lightning protection unit includes a first varistor VDR 1. A first terminal of the VDR 1 is connected to a corresponding phase line at a to-be-protected location, and a second terminal of the VDR 1 is connected to a first terminal of a second lightning protection unit.

The second lightning protection unit includes a second varistor VDR 2, a first GDT 1, and a first resistor R1. A first terminal of the VDR 2 is connected to the second terminal of the VDR 1. A second terminal of the VDR 2 is connected to a first terminal of the GDT 1. A second terminal of the GDT 1 is connected to an earth wire. The R1 is connected in parallel to the GDT 1.

A third lightning protection unit includes a third varistor VDR 3, a second GDT 2, and a second resistor R2. A first terminal of the VDR 3 is connected to the second terminal of the VDR 1. A second terminal of the VDR 3 is connected to a first terminal of the GDT 2. A second terminal of the GDT 2 is connected to the earth wire. The R2 is connected in parallel to the GDT 2.

When lightning protection is performed at the to-be-protected location by using the lightning protection apparatus shown in FIG. 12, the VDR 1, the VDR 2, and the GDT 1 each share a part of a voltage on the phase line. When the voltage and a current on the phase line increase due to lightning energy, a voltage shared by two terminals of each of the VDR 1, the VDR 2, and the GDT 1 reaches an operating voltage. In this case, the VDR 1, the VDR 2, and the GDT 1 clamp the voltage on the phase line, and transmit an excessive current to the earth wire through a first conduction path constituted by the VDR 1, the VDR 2, and the GDT 1 and a second conduction path constituted by the VDR 1, the VDR 3, and the GDT 2.

It should be understood that when the VDR 2 or the GDT 1 fails, the third lightning protection unit including the VDR 3 and the GDT 2 and the first lightning protection unit may normally transmit the lightning energy on the phase line to the earth wire, to ensure safety of the to-be-protected location.

It should be understood that when any phase line at the to-be-protected location is short-circuited, because a GDT has a high spark-over voltage value and is in a high-impedance state, a risk that the GDT is broken down due to a high voltage can be effectively avoided, and secondary damage can be avoided.

In actual use, when spark-over voltage values of the VDR 1, the VDR 2, and the GDT 1 cannot meet a lightning protection level requirement of the phase line, a quantity of GDTs 1 connected in series to the VDR 2 may be increased in the second lightning protection unit, and a quantity of GDTs 2 connected in series to the VDR 3 may be increased in the third lightning protection unit.

Certainly, the foregoing description of the lightning protection apparatus structure is merely an example. In actual application, based on different devices in the first lightning protection unit and the second lightning protection unit, the lightning protection apparatus may alternatively use another structure. Details are not described herein in this application.

Figure 13:
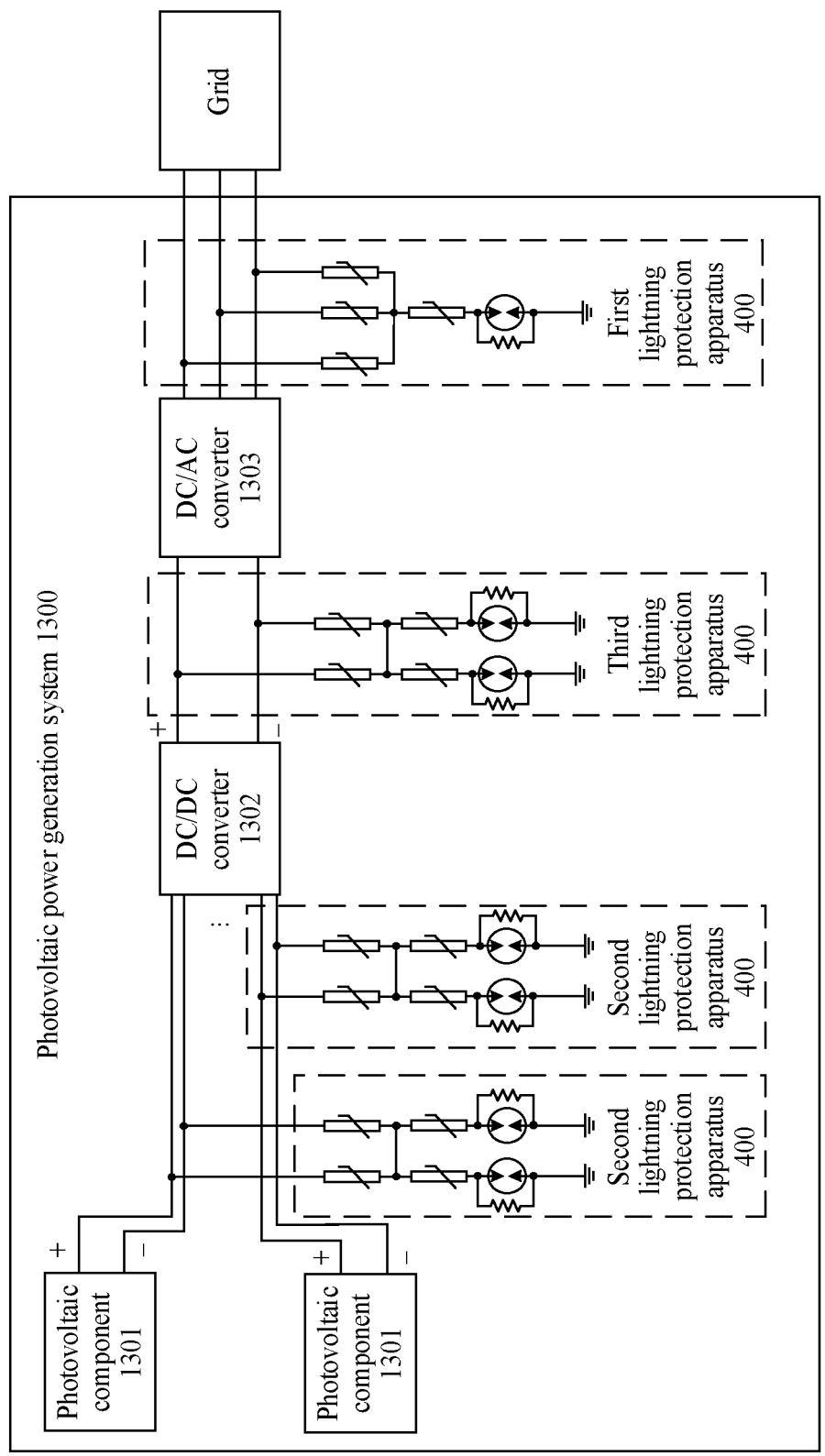
FIG. 13 is a schematic diagram 2 of a structure of a photovoltaic power generation system according to an embodiment of this application.

Based on a same concept, an embodiment of this application further provides a photovoltaic power generation system. Refer to FIG. 13. The photovoltaic power generation system 1300 includes a plurality of photovoltaic components 1301, a DC/DC converter 1302, a DC/AC converter 1303, and the foregoing first lightning protection apparatus 400.

Output terminals of the plurality of photovoltaic components 1301 are connected to an input terminal of the DC/DC converter 1302, and the plurality of photovoltaic components 1301 are configured to convert light energy into a first direct current, and output the first direct current to the DC/DC converter 1302. An output terminal of the DC/DC converter 1302 is connected to an input terminal of the DC/AC converter 1303, and the DC/DC converter 1302 is configured to convert the first direct current into a second direct current, and output the second direct current to the DC/AC converter 1303. An output terminal of the DC/AC converter 1303 is connected to a grid, and the DC/AC converter 1303 is configured to convert the second direct current into a first alternating current, and output the first alternating current to the grid. The first lightning protection apparatus 400 is connected to the output terminal of the DC/AC converter, and the first lightning protection apparatus 400 is configured to perform lightning protection on the photovoltaic power generation system 1300.

Optionally, the photovoltaic power generation system 1300 further includes the foregoing second lightning protection apparatuses 400 in a one-to-one correspondence with the plurality of photovoltaic components, and each second lightning protection apparatus is connected to an output terminal of a corresponding photovoltaic component. The second lightning protection apparatuses 400 may perform lightning protection on the plurality of photovoltaic components 1301.

Optionally, the photovoltaic power generation system 1300 further includes a third lightning protection apparatus 400 connected to the output terminal of the DC/DC converter 1302. The third lightning protection apparatus 400 may perform lightning protection on the DC/DC converter 1302.

Figure 14:
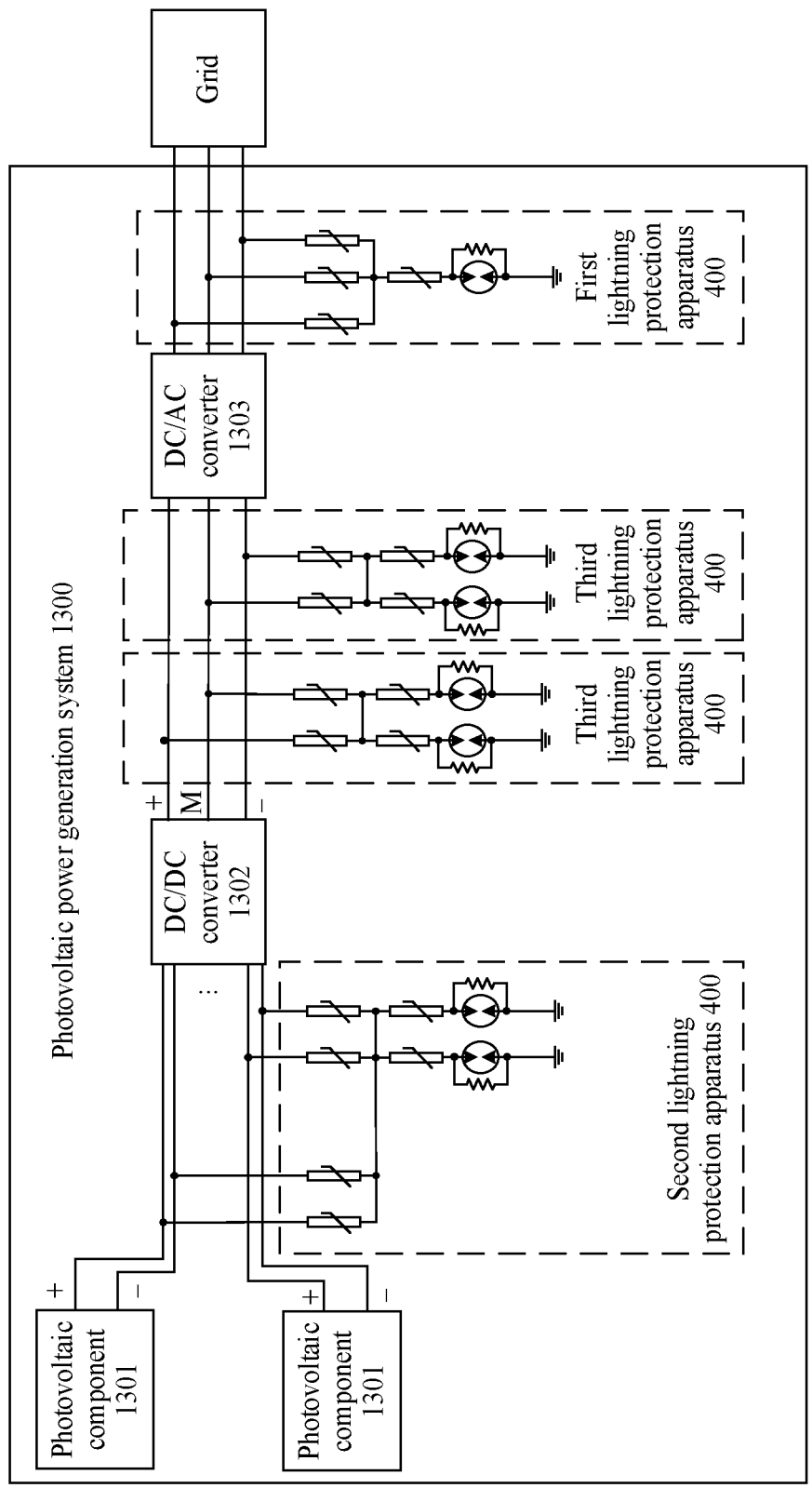
FIG. 14 is a schematic diagram 3 of a structure of a photovoltaic power generation system according to an embodiment of this application.

In a possible implementation, because the photovoltaic component has a low voltage and a small probability to undergo a lightning stroke, to reduce lightning protection costs of the photovoltaic power generation system 1300, refer to FIG. 14, the plurality of photovoltaic components 1301 may share one second lightning protection apparatus 400.

In a possible implementation, if the output terminal of the DC/DC converter 1302 is connected to a direct current bus with a neutral line M, and when any photovoltaic component undergoes a lightning stroke or a lightning stroke test, a voltage on a phase line at the output terminal of the DC/DC converter 1302 changes. To ensure normal operation of the DC/DC converter 1302, refer to FIG. 14, one third lightning protection apparatus 400 may be connected between a positive direct current bus and the neutral line M, and one third lightning protection apparatus 400 may be connected between a negative direct current bus and the neutral line M.

It should be understood that the lightning protection apparatus provided in this application is not limited to being used in the field of photovoltaic power generation, but can also be used in the fields such as wind power generation and hydroelectric power generation.

Obviously, a person skilled in the art can make various modifications and variations to this application without departing from the protection scope of this application. This application is intended to cover these modifications and variations of this application provided that they fall within the scope of protection defined by the following claims and their equivalent technologies.

What is claimed is:

1. A lightning protection apparatus disposed in a photovoltaic power generation system, wherein the lightning protection apparatus comprises:
   a plurality of phase lines located at a to-be-protected location in the photovoltaic power generation system;
   a plurality of first lightning protection units in a one-to-one correspondence with the phase lines, wherein each first lightning protection unit comprises:
      a first terminal coupled to a corresponding phase line;
      a second terminal; and
      a second branch comprising a plurality of second gas discharge tubes connected in series between the first terminal and the second terminal; and
   a second lightning protection unit connected in series with the first lightning protection units and comprising:
      a third terminal coupled to the second terminal;
      a fourth terminal coupled to an earth wire; and
      at least one gas discharge tube coupled between the earth wire and the first lightning protection units.

2. The lightning protection apparatus of claim 1, wherein each first lightning protection unit comprises a first varistor.

3. The lightning protection apparatus of claim 1, wherein each first lightning protection unit further comprises a first branch, and wherein the first branch comprises a plurality of second varistors connected in series between the first terminal and the second terminal.

4. The lightning protection apparatus of claim 1, wherein each first lightning protection unit further comprises a first gas discharge tube.

5. The lightning protection apparatus of claim 1, wherein the second lightning protection unit further comprises a third gas discharge tube.

6. The lightning protection apparatus of claim 1, wherein the second lightning protection unit further comprises a third branch, and wherein the third branch comprises a plurality of fourth gas discharge tubes connected in series between the third terminal and the fourth terminal.

7. The lightning protection apparatus of claim 5, wherein the second lightning protection unit further comprises a third varistor connected between the third gas discharge tube and the earth wire.

8. The lightning protection apparatus of claim 1, further comprising a third lightning protection unit connected in parallel to the second lightning protection unit when the phase lines transmit a direct current.

9. The lightning protection apparatus of claim 5, wherein the second lightning protection unit further comprises a first resistor connected in parallel to the third gas discharge tube.

10. A photovoltaic power generation system, comprising:
a first lightning protection apparatus comprising:
a plurality of phase lines located at a to-be-protected location in the photovoltaic power generation system;
a plurality of first lightning protection units in a one-to-one correspondence with the phase lines, wherein each first lightning protection unit comprises:
a first terminal coupled to a corresponding phase line; and
a second terminal; and
a second lightning protection unit connected in series with the first lightning protection units and comprising:
a third terminal coupled to the second terminal;
a fourth terminal coupled to an earth wire; and
at least one gas discharge tube coupled between the fourth terminal and the first lightning protection units;
a plurality of photovoltaic components comprising output terminals;
a direct current to direct current (DC/DC) converter comprising:
a DC/DC input terminal coupled to the output terminals; and
a DC/DC output terminal;
a direct current to alternating current (DC/AC) converter comprising:
a DC/AC input terminal coupled to a first the DC/DC output terminal; and
a DC/AC output terminal coupled to the first lightning protection apparatus; and
a third lightning protection apparatus connected to the DC/DC output terminal.

11. The photovoltaic power generation system of claim 10, further comprising a plurality of second lightning protection apparatuses in a one-to-one correspondence with the photovoltaic components, wherein each second lightning protection apparatus is connected to a third output terminal of a corresponding photovoltaic component.

12. The photovoltaic power generation system of claim 10, wherein each first lightning protection unit further comprises a first varistor.

13. The photovoltaic power generation system of claim 10, wherein each first lightning protection unit further comprises a first gas discharge tube.

14. The photovoltaic power generation system of claim 10, wherein the second lightning protection unit further comprises a second gas discharge tube.

15. The photovoltaic power generation system of claim 14, wherein the second lightning protection unit further comprises a second varistor connected between the second gas discharge tube and the earth wire.

16. The photovoltaic power generation system of claim 14, wherein the second lightning protection unit further comprises a first resistor connected in parallel to the second gas discharge tube.

17. The photovoltaic power generation system of claim 10, wherein the first third lightning protection apparatus comprises:
a plurality of third lightning protection units in a one-to-one correspondence with the phase lines of the DC/DC output terminal, wherein each third lightning protection unit comprises:
a fifth terminal coupled to a corresponding phase line; and
a sixth terminal; and
a fourth lightning protection unit connected in series with the third lightning protection units and comprising:
a seventh terminal coupled to the sixth terminal;
an eighth terminal coupled to the earth wire; and
at least one gas discharge tube coupled between the eighth terminal and the third lightning protection units; and
a fifth lightning protection unit connected in parallel to the fourth lightning protection unit.

18. The photovoltaic power generation system of claim 17, wherein the fifth lightning protection unit comprises a third gas discharge tube.

19. A lightning protection apparatus disposed in a photovoltaic power generation system, wherein the lightning protection apparatus comprises:
a plurality of phase lines located at a to-be-protected location in the photovoltaic power generation system;
a plurality of first lightning protection units in a one-to-one correspondence with the phase lines, wherein each first lightning protection unit comprises:
a first terminal coupled to a corresponding phase line; and
a second terminal;
a second lightning protection unit connected in series with the first lightning protection units and comprising:
a third terminal coupled to the second terminal;
a fourth terminal coupled to an earth wire; and
at least one gas discharge tube coupled between the earth wire and the first lightning protection units; and
a third lightning protection unit connected in parallel to the second lightning protection unit when the phase lines transmit a direct current.

20. The lightning protection apparatus of claim 19, wherein each first lightning protection unit comprises a first varistor or a first gas discharge tube.

* * * * *